(12) United States Patent
Lin

(10) Patent No.: US 11,085,221 B2
(45) Date of Patent: Aug. 10, 2021

(54) CAR DOOR OPENING MECHANISM

(71) Applicant: Yao-Kuo Lin, New Taipei (TW)

(72) Inventor: Yao-Kuo Lin, New Taipei (TW)

(*) Notice: Subject to any disclaimer, the term of this patent is extended or adjusted under 35 U.S.C. 154(b) by 188 days.

(21) Appl. No.: 16/529,767

(22) Filed: Aug. 1, 2019

(65) Prior Publication Data
US 2020/0040635 A1 Feb. 6, 2020

(30) Foreign Application Priority Data
Aug. 6, 2018 (TW) .................. 107127189

(51) Int. Cl.
*E05F 5/06* (2006.01)
*B60J 5/04* (2006.01)

(52) U.S. Cl.
CPC ............. *E05F 5/06* (2013.01); *B60J 5/047* (2013.01)

(58) Field of Classification Search
CPC ...... E05C 17/203; E05C 17/206; E05C 17/08; E05C 17/22; E05F 5/06; E05D 11/06; Y10T 16/61
See application file for complete search history.

(56) References Cited

U.S. PATENT DOCUMENTS

| | | | | |
|---|---|---|---|---|
| 4,841,600 A | * | 6/1989 | Sasamura | E05C 17/203 16/335 |
| 5,862,570 A | * | 1/1999 | Lezuch | E05C 17/085 16/82 |
| 7,971,393 B2 | * | 7/2011 | Gao | E05F 15/60 49/386 |
| 8,231,167 B2 | * | 7/2012 | Endo | B60J 5/0437 296/187.12 |
| 9,068,388 B2 | * | 6/2015 | Costigan | E05D 11/06 |
| 9,650,826 B2 | * | 5/2017 | Potter | E05D 15/00 |
| 2012/0192492 A1 | * | 8/2012 | Cutting | E05C 17/08 49/394 |
| 2014/0137474 A1 | * | 5/2014 | Suzuki | E05B 81/14 49/31 |

* cited by examiner

*Primary Examiner* — Justin B Rephann
(74) *Attorney, Agent, or Firm* — Leong C. Lei

(57) ABSTRACT

A car door opening mechanism includes a connection structure that is selectively mounted to a car-door opening/closing side, a car-door bottom side, a car-body opening/closing side, or a car-body bottom side and a first coupling member correspondingly mounted to a car-body opening/closing side, a car-body bottom side, a car-door opening/closing side, or a car-door bottom side. When a car door is at a closed position relative to a car body, the first coupling member and the connection structure are coupled to each other and in opening the car door, the car door is constrained at a non-fully opened position due to the connection structure and the first coupling member being coupled to each other. When the first coupling member and the connection structure are detached from each other, the car door is allowed to open from the non-fully opened position to a fully opened position.

15 Claims, 13 Drawing Sheets

CAR DOOR OPENING MECHANISM

TECHNICAL FIELD OF THE INVENTION

The present invention provides a car door opening mechanism, and more particularly to a car door opening mechanism that enables a two-stage car door opening operation.

DESCRIPTION OF THE PRIOR ART

Accidents that motorcycle riders bump into car doors that are opened by a driver or a passenger of a car and fall down and get hurt are common on the roads and streets. The avoid such accidents, the governor agencies have widely advertised that any person intending to open a car door must first look back to ensure no incoming vehicles before actually opening the car door and to first open the car door slightly to signal an incoming vehicle of the car door being opened, so that the incoming vehicle may switch to a different lane for dodge and the car door can then be fully opened after it is ensured that no further incoming vehicle is coining toward the car. However, some drivers and car passengers are not accustomed to the two-stage car door opening operation. In addition, cars that are currently available in the market are generally not equipped with a mechanism that helps prevent a car door from being unexpectedly opened. These make accidents caused by unexpectedly opening a car door still occur frequently.

SUMMARY OF THE INVENTION

Thus, an objective of the present invention is to provide a car door opening mechanism that enables a two-stage car door opening operation in order to alleviate or overcome the issues discussed above.

To achieve the above objective, the present invention discloses a car door opening mechanism. The car door opening mechanism is installed between a car body and a car door that is rotatable relative to the car body. The car body comprises a car-body pivoting side, a car-body top side, a car-body bottom side, and a car-body opening/closing side. The car-body top side and the car-body bottom side are adjacent to the car-body pivoting side and are opposite to each other. The car-body opening/closing side and the car-body pivoting side are opposite to each other. The car-body opening/closing side is adjacent to the car-body top side and the car-body bottom side. The car door comprises a car-door pivoting side, a car-door top side, a car-door bottom side, and a car-door opening/closing side. The car-door top side and the car-door bottom side are adjacent to the car-door pivoting side and are opposite to each other. The car-door opening/closing side and the car-door pivoting side are opposite to each other. The car-door opening/closing side is adjacent to the car-door top side and the car-door bottom side. The car-door pivoting side and the car-body pivoting side are connected to each other in a manner of being rotatable relative to each other. The car door opening mechanism comprises a connection structure and a first coupling member. The connection structure is selectively mounted to the car-door opening/closing side, the car-door bottom side, the car-body opening/closing side, or the car-body bottom side. The first coupling member is operable to couple to or detach from the connection structure. For the connection structure being mounted to the car-door opening/closing side, the first coupling member is correspondingly mounted to the car-body opening/closing side; for the connection structure being mounted the car-door bottom side, the first coupling member is correspondingly mounted to the car-body bottom side; for the connection structure being mounted to the car-body opening/closing side, the first coupling member is correspondingly mounted to the car-door opening/closing side; for the connection structure being mounted to the car-body bottom side, the first coupling member is correspondingly mounted to the car-door bottom side. When the car door is at a closed position relative to the car body, the first coupling member and the connection structure are coupled to each other. In a process that the car door is being opened relative to the car body, an opening angle of the car door relative to the car body is constrained by a length of the connection structure due to the connection structure and the first coupling member being coupled to each other so that the car door is constrained at a non-fully opened position between a fully opened position and the closed position relative to the car body. When the first coupling member and the connection structure are detached from each other, the car door is allowed to open relative to the car body from the non-fully opened position to the fully opened position.

In summary, the present invention uses a coupling arrangement between the first coupling member and the connection structure to constraint the car door at a non-fully opened position relative to the car body by means of the connect structure at the time when the user intends to open the car door relative to the car body. At this moment, the user needs to make a further operation in order to have the first coupling member and the connection structure detach from each other in order to allow the car door to be further opened relative to the car body to the fully opened position. In this way, the two-stage car door opening operation according to the present invention could effectively prevent collision caused by an unexpected incident of fully opening of a car door. Further, in an opening operation, the car door is subjected to constraint imposed by the connection structure and is thus set at the non-fully opened position relative to the car body, so that the car door opening mechanism according to the present invention also helps prevent a child from falling out of a car due to erroneous opening of a car door.

DETAILED DESCRIPTION OF THE PREFERRED EMBODIMENT

Figure 1:
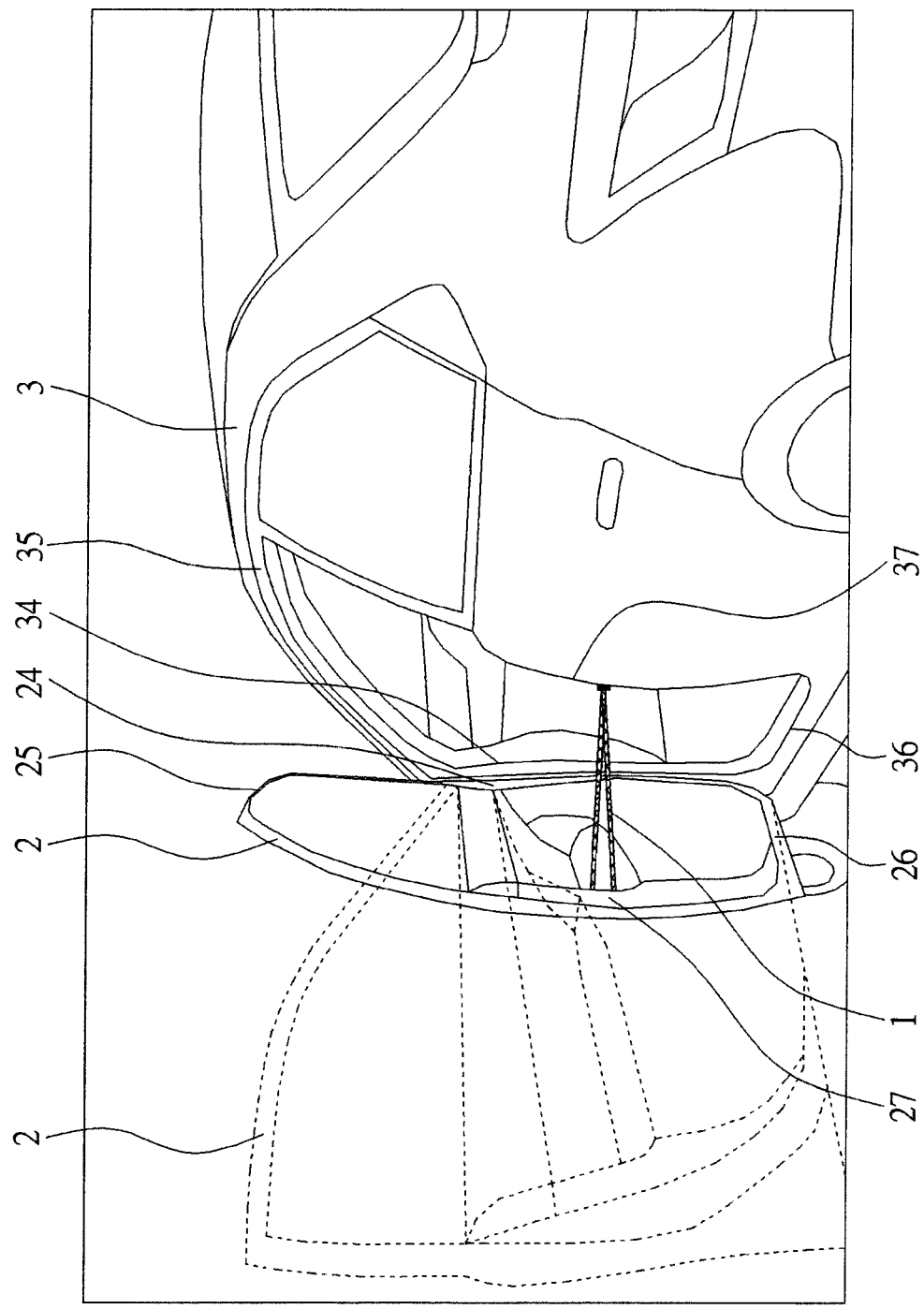
FIG. 1 is a schematic view showing a car door opening mechanism according to a first embodiment of the present invention installed between a car door and a car body.

In the embodiments described in the following, terminology that is used to describe or define directions, such as "up", "down", "left", "right", "front", and "rear", is provided by referring to the directions observed in the drawing sheets of the attached drawings. Thus, such terminology that is used to describe or define directions is simply for the purposes of illustration and explanations and is by no means intended to constrain the scope of the present invention.

Figure 2:
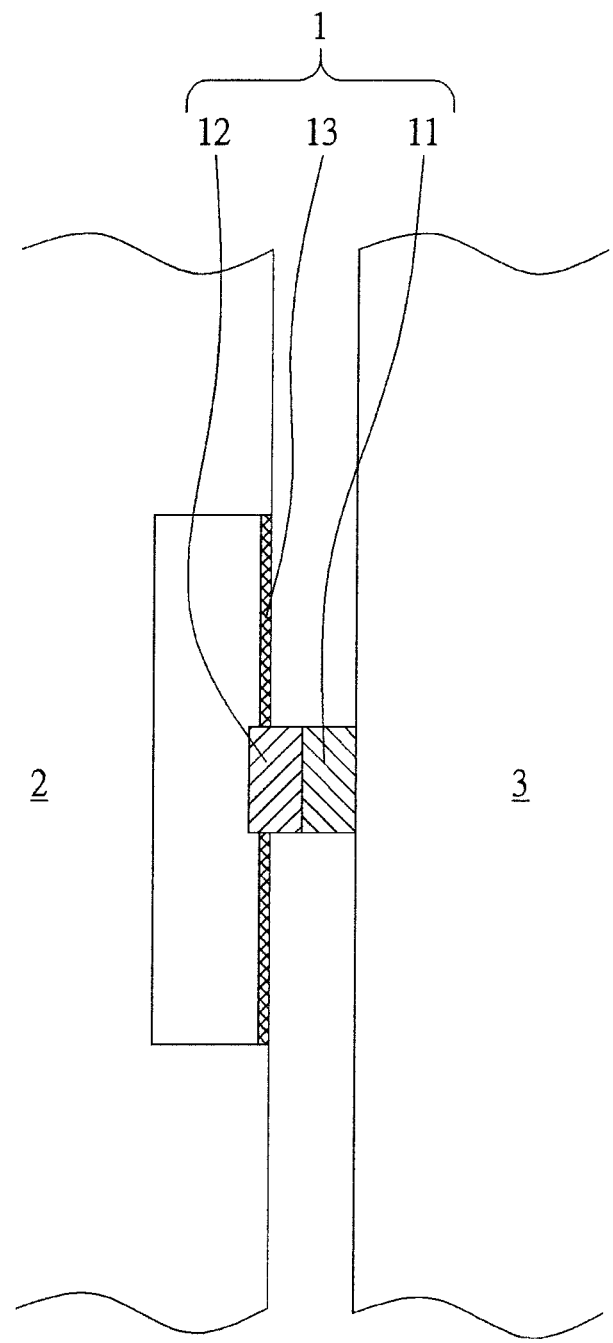
FIG. 2 is a schematic view showing the car door opening mechanism according to the first embodiment of the present invention in a condition when a car door is at a closed position relative to a car body.
Figure 3:
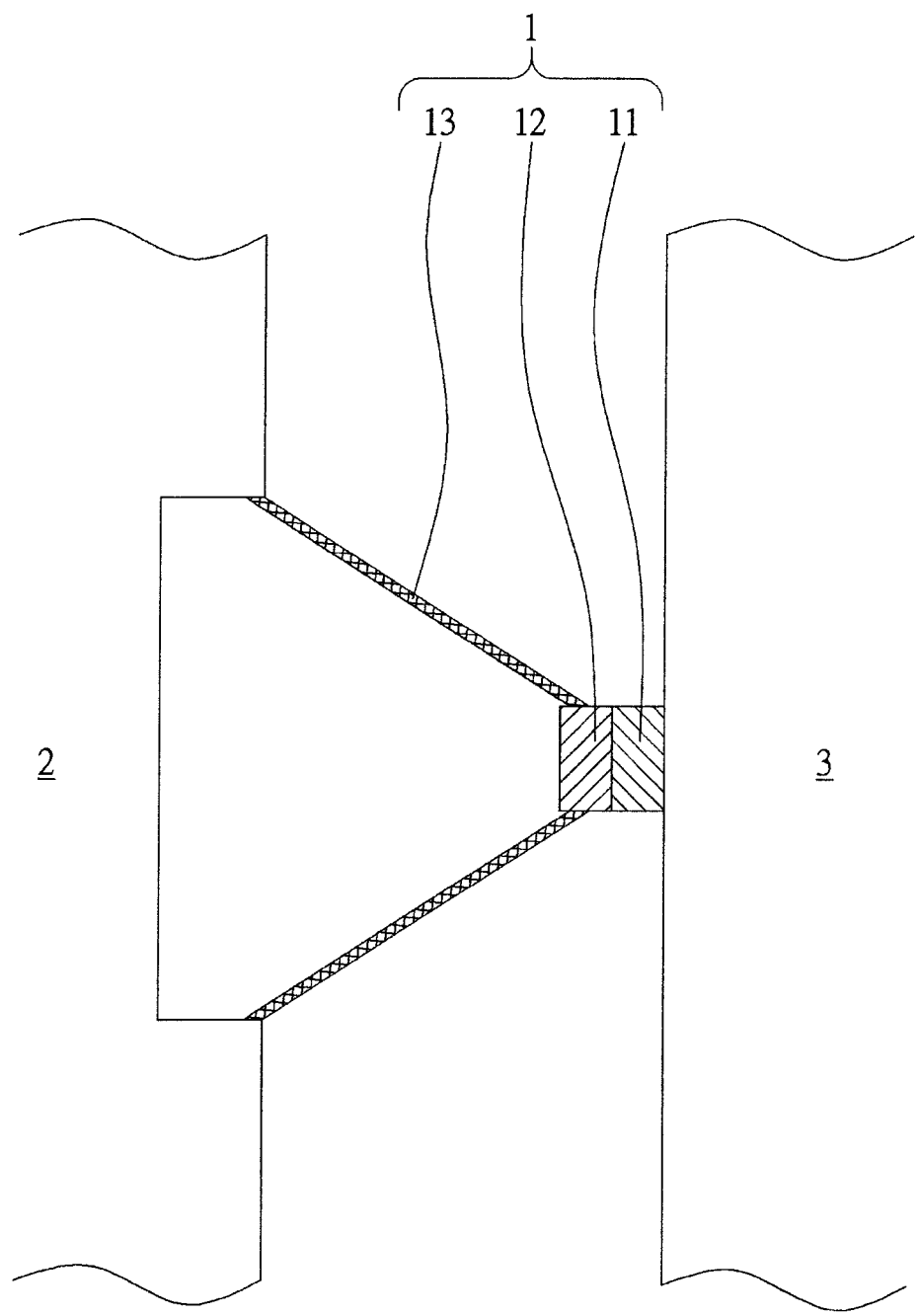
FIG. 3 is a schematic view showing the car door opening mechanism according to the first embodiment of the present invention in a condition when a car door is at a non-fully opened position relative to a car body.
Figure 4:
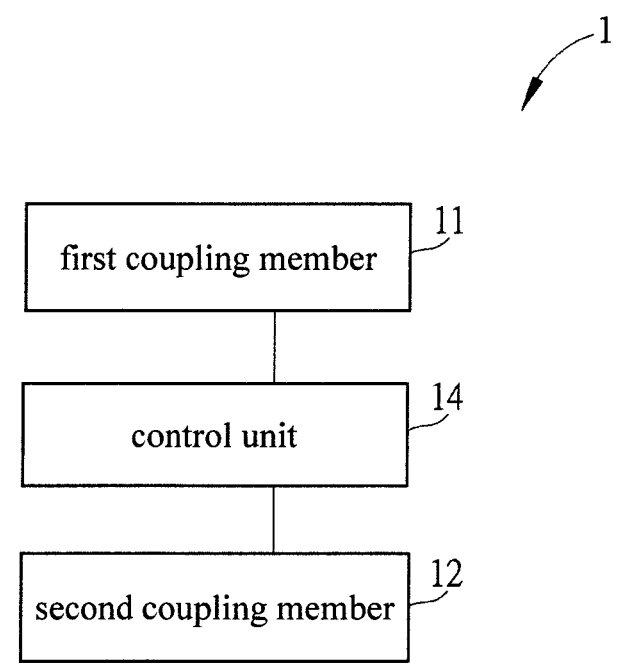
FIG. 4 is a functional block diagram of the car door opening mechanism according to the first embodiment of the present invention.

Referring to FIGS. 1-4, FIG. 1 is a schematic view showing a car door opening mechanism 1 according to a first embodiment of the present invention installed between a car door 2 and a car body 3; FIG. 2 is a schematic view showing the car door opening mechanism 1 according to the first embodiment of the present invention in a condition when the car door 2 is at a closed position relative to the car body 3; FIG. 3 is a schematic view showing the car door opening mechanism 1 according to the first embodiment of the present invention in a condition when the car door 2 is at a non-fully opened position relative to the car body 3; and FIG. 4 is a functional block diagram of the car door opening mechanism 1 according to the first embodiment of the present invention. As shown in FIGS. 1-5, the car door opening mechanism 1 according to the present invention is arranged between the car door 2 that is rotatable relative to the car body 3 for opening and closing and the car body 3. The car body 3 comprises a car-body pivoting side 34, a car-body top side 35, a car-body bottom side 36, and a car-body opening/closing side 37. The car-body top side 35 and the car-body bottom side 36 are adjacent to the car-body pivoting side 34 and are opposite to each other. The car-body opening/closing side 37 and the car-body pivoting side 34 are opposite to each other. The car-body opening/closing side 37 is adjacent to the car-body top side 35 and the car-body bottom side 36. The car door 2 comprises a car-door pivoting side 24, a car-door top side 25, a car-door bottom side 26, and a car-door opening/closing side 27. The car-door top side 25 and the car-door bottom side 26 are adjacent to the car-door pivoting side 24 and are opposite to each other. The car-door opening/closing side 27 and the car-door pivoting side 24 are opposite to each other. The car-door opening/closing side 27 is adjacent to the car-door top side 25 and the car-door bottom side 26. The car-door pivoting side 24 and the car-body pivoting side 34 are connected to each other in a manner of being rotatable relative to each other in order to realize opening and closing of the car door 2 relative to the car body 3. The car door opening mechanism 1 is provided to limit an opening angle by which the car door 2 is opened relative to the car body 3, so that the car door 2 is constrained at a non-fully opened position illustrated with solid lines in FIG. 1 without being opened to a fully opened position illustrated with phantom lines in FIG. 1 and thus preventing collision accidents caused by the car door 2 being fully opened in an unexpected manner. The car door opening mechanism 1 comprises a first coupling member 11, a second coupling member 12, a connection structure 13, and a control unit 14. The first coupling member 11 is arranged on the car body 3. The connection structure 13 is arranged on the car door 2. The second coupling member 12 is arranged on the connection structure 13 at a location corresponding to the first coupling member 11. In the instant embodiment, the first coupling member 11 and the second coupling member 12 are each an electromagnet. The control unit 14 is electrically connected to the first coupling member 11 and the second coupling member 12 in order to control magnetism of each of the first coupling member 11 and the second coupling member 12 to have the first coupling member 11 and the connection structure 13 to couple to each other through attraction resulting from magnetisms of the first coupling member 11 and the second coupling member 12. Further, in the instant embodiment, to enhance convenience of use, the connection structure 13 is preferably an extendable/contractible rod, an extendable/contractible wire, or an elastic wire made of an elastic material; however, the present invention is not limited thereto and is determined according to the needs of actual designs. For example, in another embodiment, the first coupling member 11 and the second coupling member 12 can respectively be an electromagnet and a magnetically permeable member or an electromagnet and a permanent magnet. In such an embodiment, the control unit 14 is electrically connected to the first coupling member 11 to control the magnetism of the first coupling member 11 to have the first coupling member 11 and the connection structure 13 couple to each other through magnetic attraction between the first coupling member 11 and the second coupling member 12.

Figure 5:
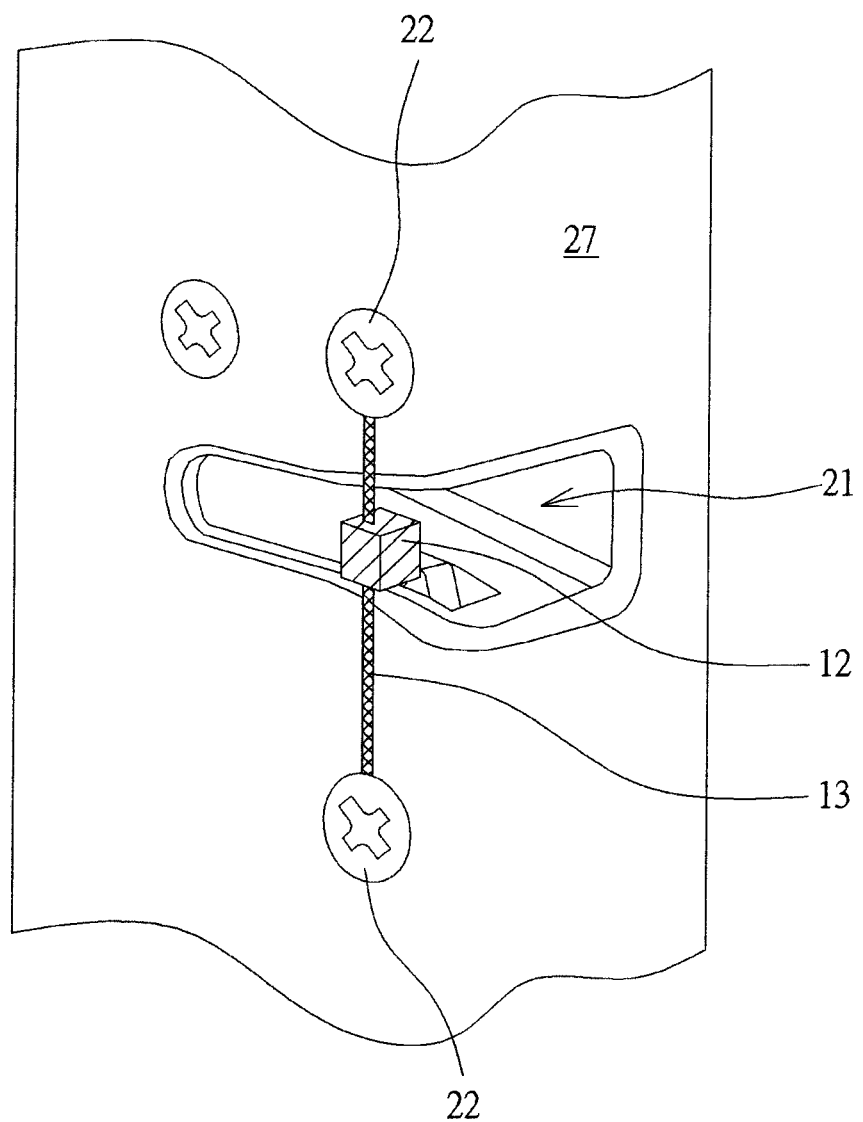
FIG. 5 is a schematic view showing installation of a connection structure of the first embodiment of the present invention.
Figure 6:
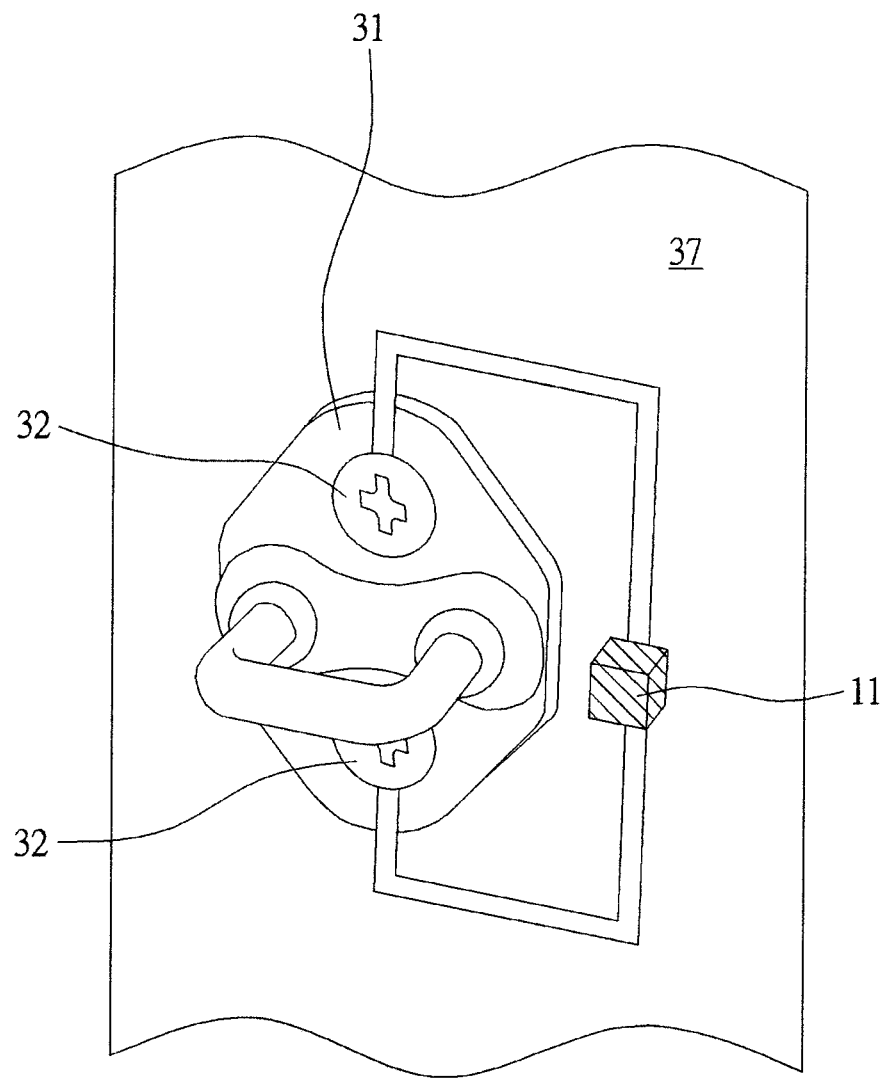
FIG. 6 is a schematic view showing installation of a first coupling member of the first embodiment of the present invention.
Figure 7:
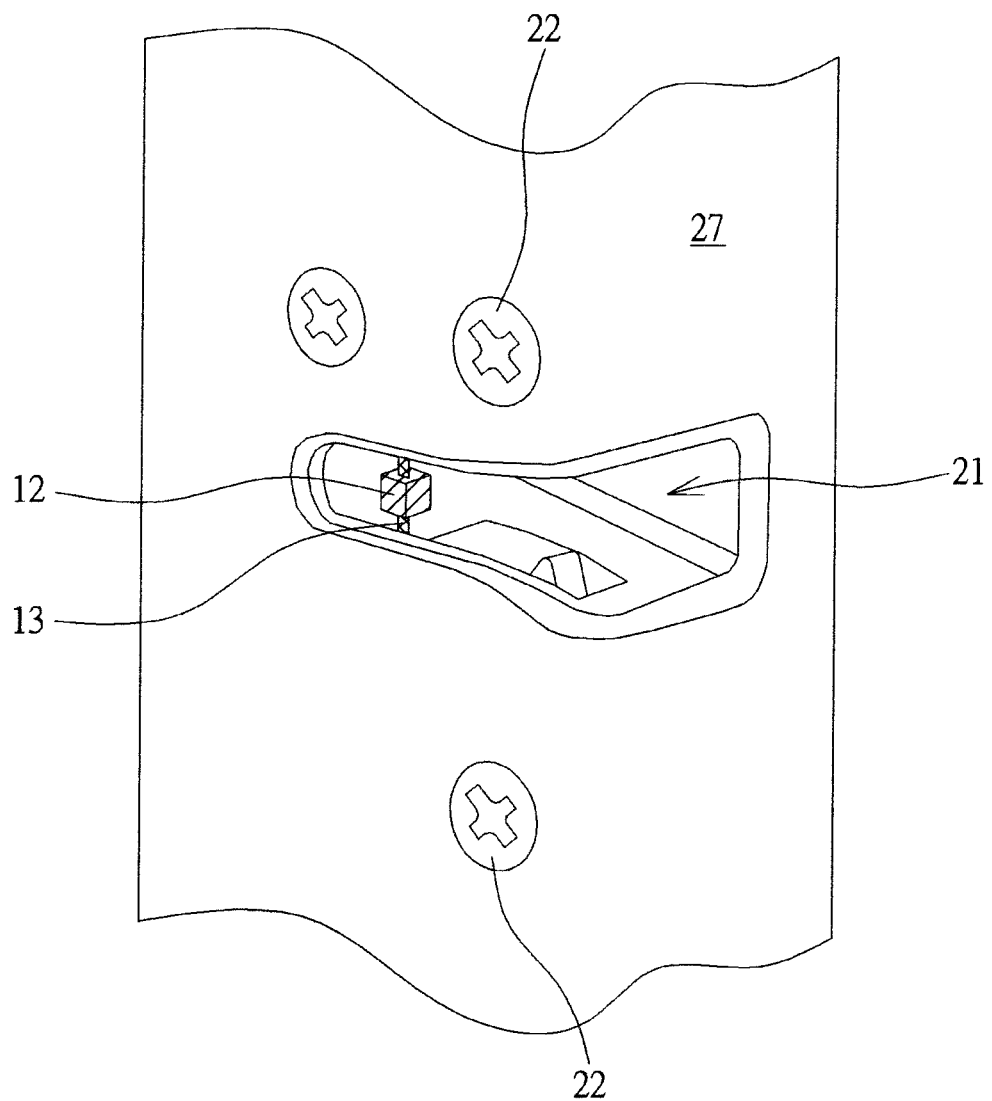
FIG. 7 is a schematic view showing a connection structure of a different embodiment of the present invention.
Figure 8:
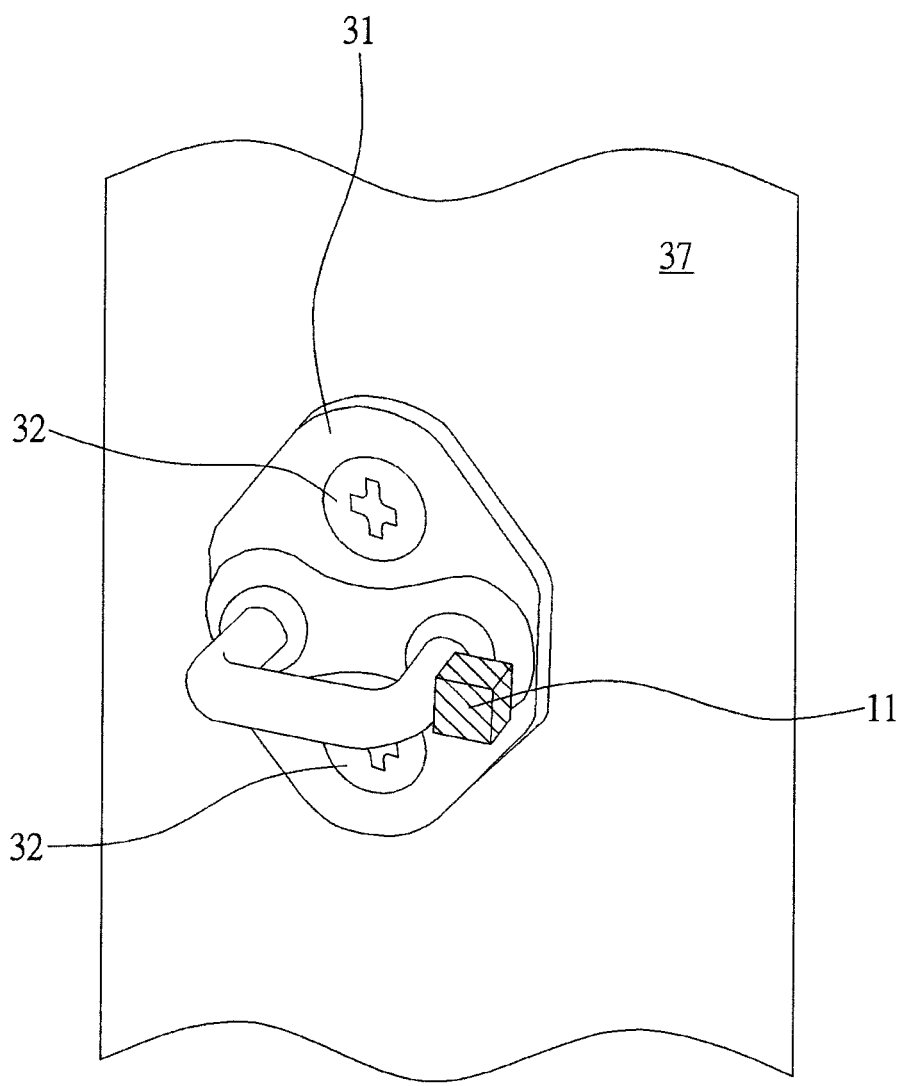
FIG. 8 is a schematic view showing a first coupling member of a different embodiment of the present invention.

Further, referring to FIGS. 5 and 6, FIG. 5 is a schematic view showing installation of the connection structure 13 of the first embodiment of the present invention; and FIG. 6 is a schematic view showing installation of the first coupling member 11 of the first embodiment of the present invention. As shown in FIGS. 5 and 6, in the instant embodiment, the car body 3 is provided with a door lock hook 31, and the car door 2 is provided with a door lock actuator 21. The door lock actuator 21 and the door lock hook 31 are provided to correspond to each other. In the instant embodiment, the door lock hook 31 and the door lock actuator 21 are respectively mounted to the car-body opening/closing side 37 and the car-door opening/closing side 27; however, the present invention is not limited thereto, for example, the door lock hook 31 and the door lock actuator 21 may alternatively be mounted to the car-body bottom side 36 and the car-door bottom side 26. When the car door 2 is located at the closed position relative to the car body 3, the door lock hook 31 is in locking engagement with the door lock actuator 21 so as to position and retain the car door 2 at the closed position. The first coupling member 11 is preferably mounted to the car-body opening/closing side 37 and is adjacent to a location where the door lock hook 31 is arranged on the car body 3, so that the first coupling member 11 can be fixed on the car body 3 by at least one fastener 32 (such as a bolt) of the door lock hook 31. The connection structure 13 is preferably mounted to the car-door opening/closing side 27 and is adjacent to a location where the door lock actuator 21 is arranged on the car door 2, so that the connection structure 13 can be fixed on the car door 2 by at least one fastener 22 (such as a bolt) of the door lock actuator 21. As such, when the car door 2 is located at the closed position relative to the car body 3, the first coupling member 11 is set adjacent to the connection structure 13. However, the way and the location for arrangement of the first coupling member 11 and the connection structure 13 of the present invention are not limited to such an example. For example, referring to FIGS. 7 and 8, FIG. 7 is a schematic view showing a connection structure 13 according to a different embodiment of the present invention; and FIG. 8 is a schematic view showing a first coupling member 11 according to a different embodiment of the present invention. In the instant embodiment, the first coupling member 11 is directly arranged on the door lock hook 31 and is integrally formed with the door lock hook 31 to be coupled thereto; and the connection structure 13 is directly arranged on the door lock actuator 21 and is integrally formed with the door lock actuator 21 to be coupled thereto. Or, in an alternative embodiment, the first coupling member 11 and the connection structure 13 may switched with each other in respect of position so as to be respectively arranged at a location adjacent to the door lock actuator 21 and a location adjacent to the door lock hook 31, or are, alternatively, integrally formed with the door lock actuator 21 and the door lock hook 31 to be coupled thereto. Further, in an alternative embodiment, the first coupling member 11 and the connection structure 13 are respectively set on one and the other one of the car-body bottom side 36 and the car-door bottom side 26 and correspond to each other and are distant from the door lock actuator 21 and the door lock hook 31. In other words, when the connection structure 13 is mounted to the car-door opening/closing side 27, the first coupling member 11 is correspondingly set on the car-body opening/closing side 37; when the connection structure 13 is mounted to the car-door bottom side 26, the first coupling member 11 is correspondingly set on the car-body bottom side 36; when the connection structure 13 is mounted to the car-body opening/closing side 37, the first coupling member 11 is correspondingly set on the car-door opening/closing side 27; when the connection structure 13 is mounted to the car-body bottom side 36, the first coupling member 11 is correspondingly set on the car-door bottom side 26.

The principle of operation of the car door opening mechanism 1 according to the present invention will be described below. As shown in FIG. 2, since the first coupling member 11 and the connection structure 13 are respectively arranged adjacent to the door lock hook 31 and the door lock actuator 21, when the car door 2 is set at the closed position relative to the car body 3 to have the door lock hook 31 in locking engagement with the door lock actuator 21, the first coupling member 11 is located adjacent to the connection structure 13 and the control unit 14 may control, through energization, the magnetisms of the first coupling member 11 and the second coupling member 12 to have the first coupling member 11 and the second coupling member 12 magnetically attract each other and thus having the first coupling member 11 and the connection structure 13 couple to each through the magnetic attraction between the first coupling member 11 and the second coupling member 12. Next, as shown in FIGS. 1 and 3, in a process that the car door 2 is opened relative to the car body 3, the connection structure 13 is extended with increase of an opening angle of the car door 2 relative to the car body 3 until a length of the connection structure 13 reaches a predetermined length (namely a maximum extended length), so that the car door 2 is constrained, relative to the car body 3, at a non-fully opened position between the fully opened position and the closed position. At this moment, since the length of the connection structure 13 has reached the maximum extended length, even a user is still applying a force, attempting to further open the car door 2, the car door 2 is still kept in position and thus constrained at the non-fully opened position by the connection structure 13. After confirming that no incoming vehicle is coming, the user may use the control unit 14 (such as operating an interface provided on a car dashboard) to control the magnetisms of the first coupling member 11 and the second coupling member 12, so that the first coupling member 11 and the second coupling member 12 do not magnetically attract each other, allowing the first coupling member 11 and the connection structure 13 to detach from each other. In this way, the car door 2 is no longer constrained by the connection structure 13 and can be further opened relative to the car body 3 to reach the fully opened position. Thus, the car door opening mechanism according to the present invention provides a two-stage car door opening operation that can effectively prevent traffic accidents caused by unexpected opening of the car door 2. Further, when the first coupling member 11 and the connection structure 13 are detached and disengaged from each other, the connection structure 13 is allowed to elastically restore the position thereof, so that when the car door 2 returns in position as moving relative to the car body 3 to be located at the closed position again, the control unit 14 could regain control of the magnetisms of the first coupling member 11 and the second coupling member 12 to have the first coupling member 11 and the second coupling member 12 magnetically attract each other and thus having the first coupling member 11 and the connection structure 13 couple to each other again by means of the magnetic attraction between the first coupling member 11 and the second coupling member 12.

Further, the material of the connection structure 13 according to the present invention is not limited to what described in the above embodiments. For example, in another embodiment, the connection structure 13 can be a wire or a chain made of a rigid material and in such an embodiment, although the length of the connection structure 13 is not extended with increase of the opening angle of the car door 2 relative to the car body 3, the opening angle of the car door 2 relative to the car body 3 is still constrained by the length of the connection structure 13, and thus, the car door 2 is still constrained at the non-fully opened position.

Figure 9:
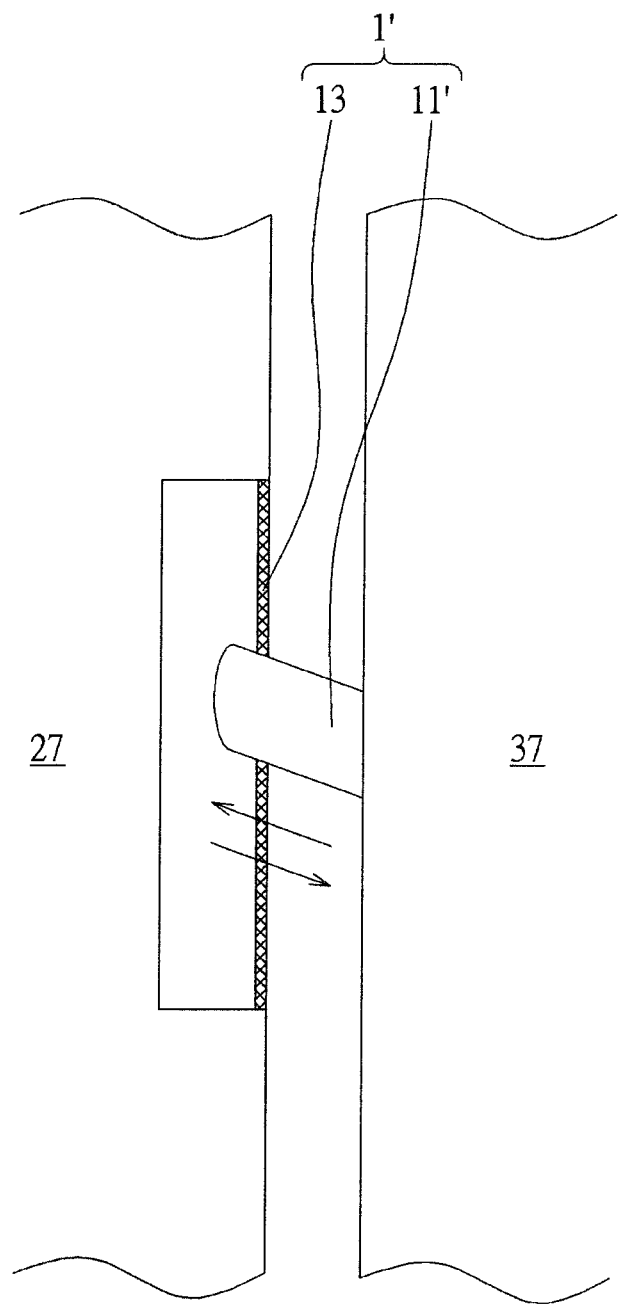
FIG. 9 is a schematic view showing a car door opening mechanism according to a second embodiment of the present invention in a condition when a car door is at a closed position relative to a car body.
Figure 10:
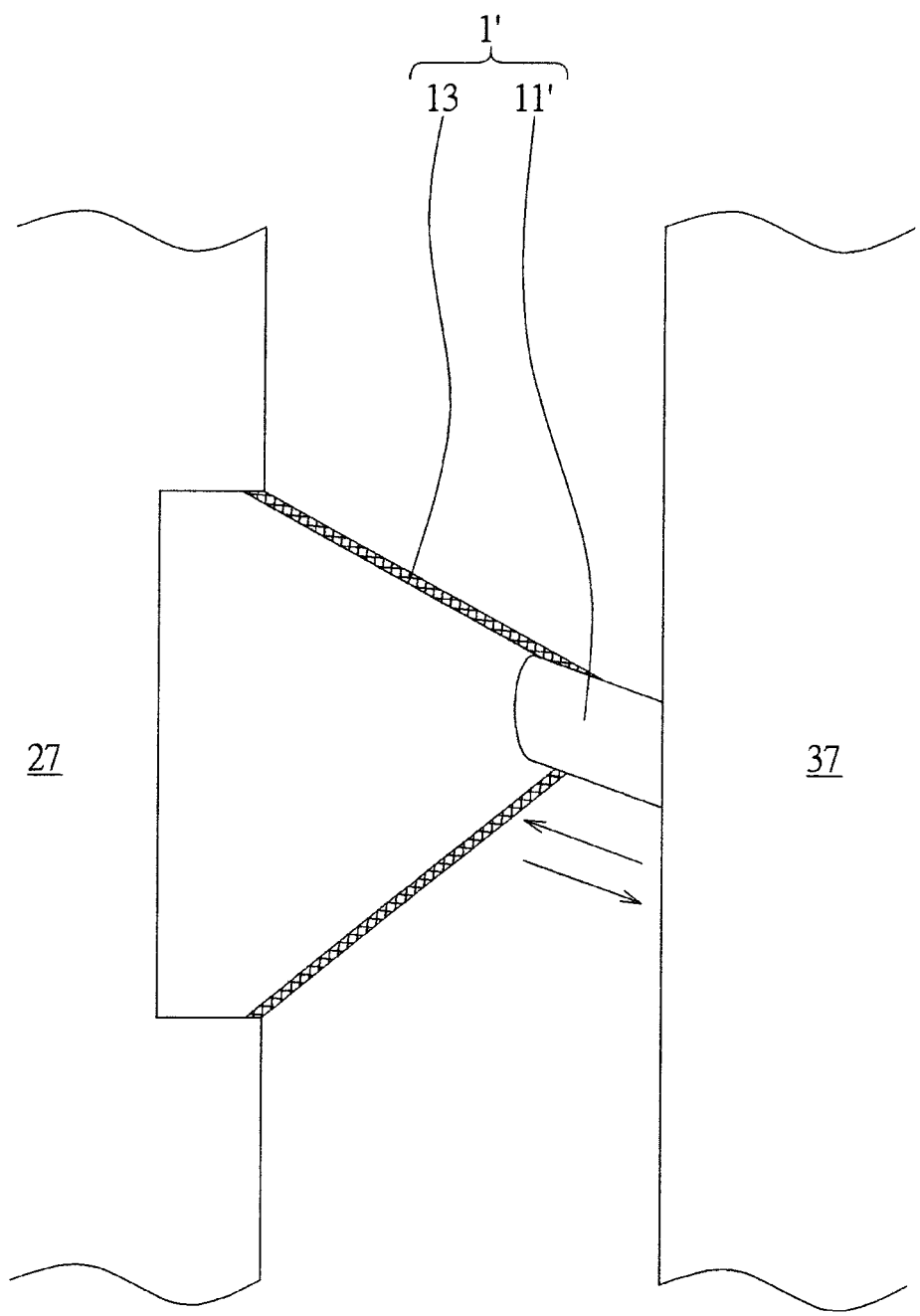
FIG. 10 is a schematic view showing the car door opening mechanism according to the second embodiment of the present invention in a condition when a car door is at a non-fully opened position relative to a car body.

Further, referring to FIGS. 9 and 10, FIG. 9 is a schematic view showing a car door opening mechanism 1' according to a second embodiment of the present invention in a condition when the car door 2 is at a closed position relative to the car body 3; and FIG. 10 is a schematic view showing the car door opening mechanism 1' according to the second embodiment of the present invention in a condition when the car door is at 2a non-fully opened position relative to the car body 3. As shown in FIGS. 9 and 10, a difference from the car door opening mechanism 1 of the first embodiment is that the car door opening mechanism 1' of the instant embodiment only comprises a first coupling member 11' but does not comprise the second coupling member 12 of the first embodiment. The first coupling member 11' comprises a raised pillar that is mounted, in an extendable and contractible manner, on the car-body opening/closing side 37. When the car door 2 is set at the closed position relative to the car body 3, the control unit 14 controls the first coupling member 11' to extend and couple to the connection structure 13. In a process that the car door 2 is being opened relative to the car body 3, the connection structure 13 is extended with increase of the opening angle of the car door 2 relative to the car body 3 until the length of the connection structure 13 reaches a predetermined length, so that the car door 2 is constrained, relative to the car body 3, at a non-fully opened position between the fully opened position and the closed position. After confirming that no incoming vehicle is coining, the user may use the control unit 14 to control the first coupling member 11' to contract and detach from the connection structure 13 to allow the car door 2 to be further opened relative to the car body 3 to reach the fully opened position. Further, when the first coupling member 11' and the connection structure 13 are detached and disengaged from each other, the connection structure 13 is allowed to elastically restore the position thereof, so that when the car door 2 returns in position as moving relative to the car body 3 to be located at the closed position again, the control unit 14 could regain control of the first coupling member 11' for extension to couple to the connection structure 13 again. Further, the first coupling member 11' and the connection structure 13 may be switched with each other to be respectively mounted on the car door 2 and the car body 3, and this could be determined according to the needs of actual designs.

Figure 11:
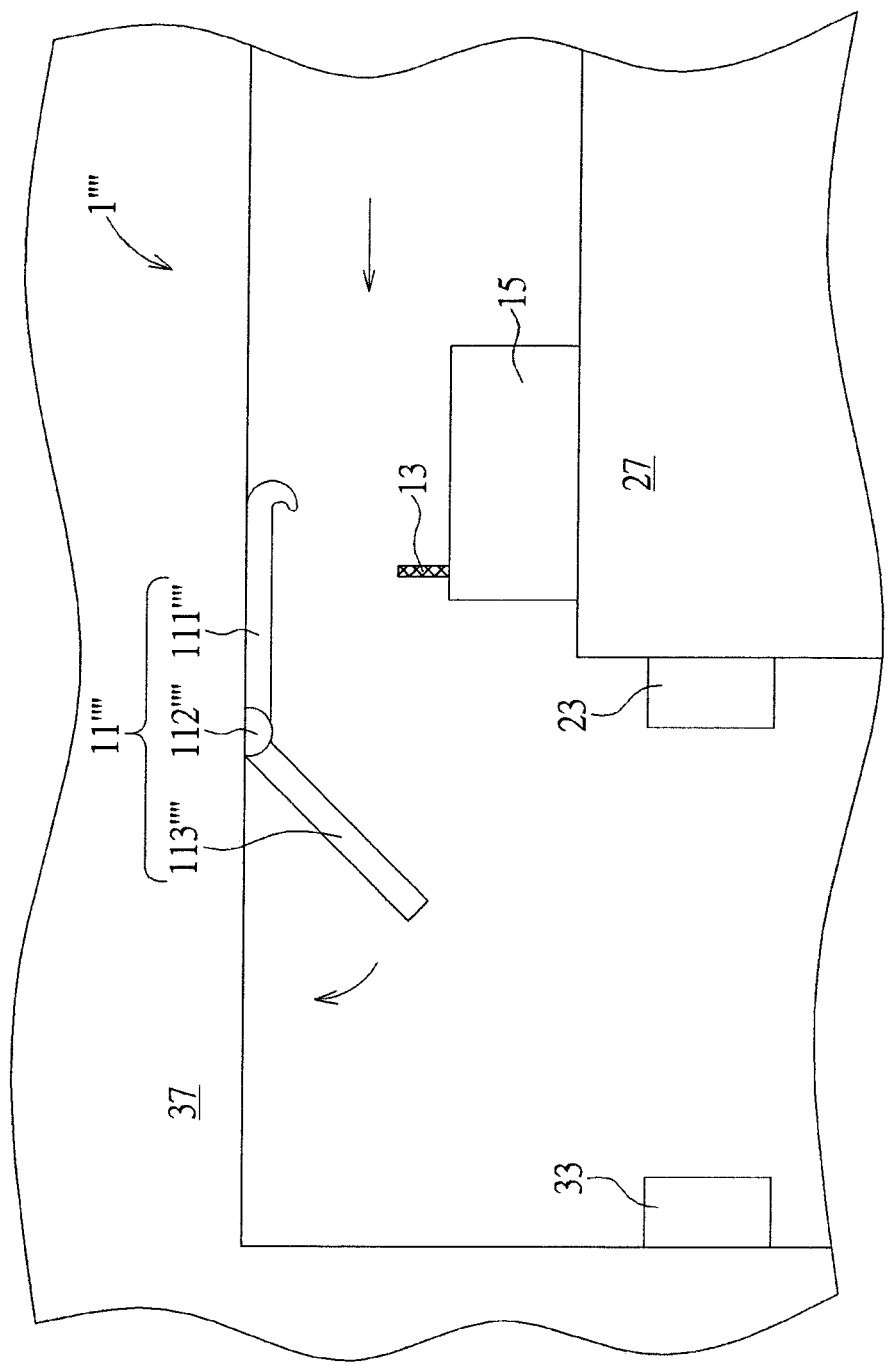
FIGS. 11-13 are schematic views respectively showing a car door opening mechanism according to a third embodiment of the present invention in different conditions.
Figure 12:
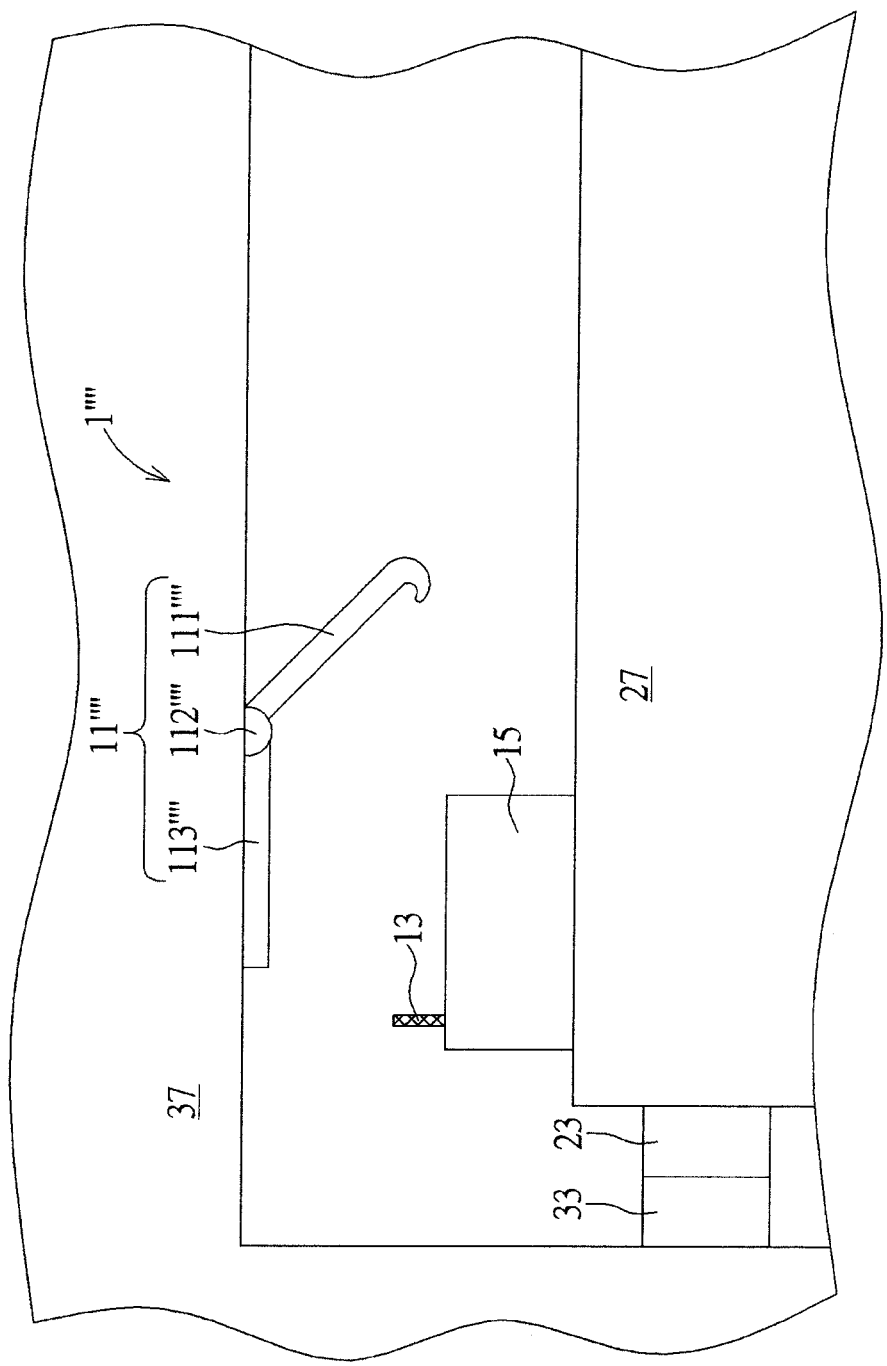
Figure 13:
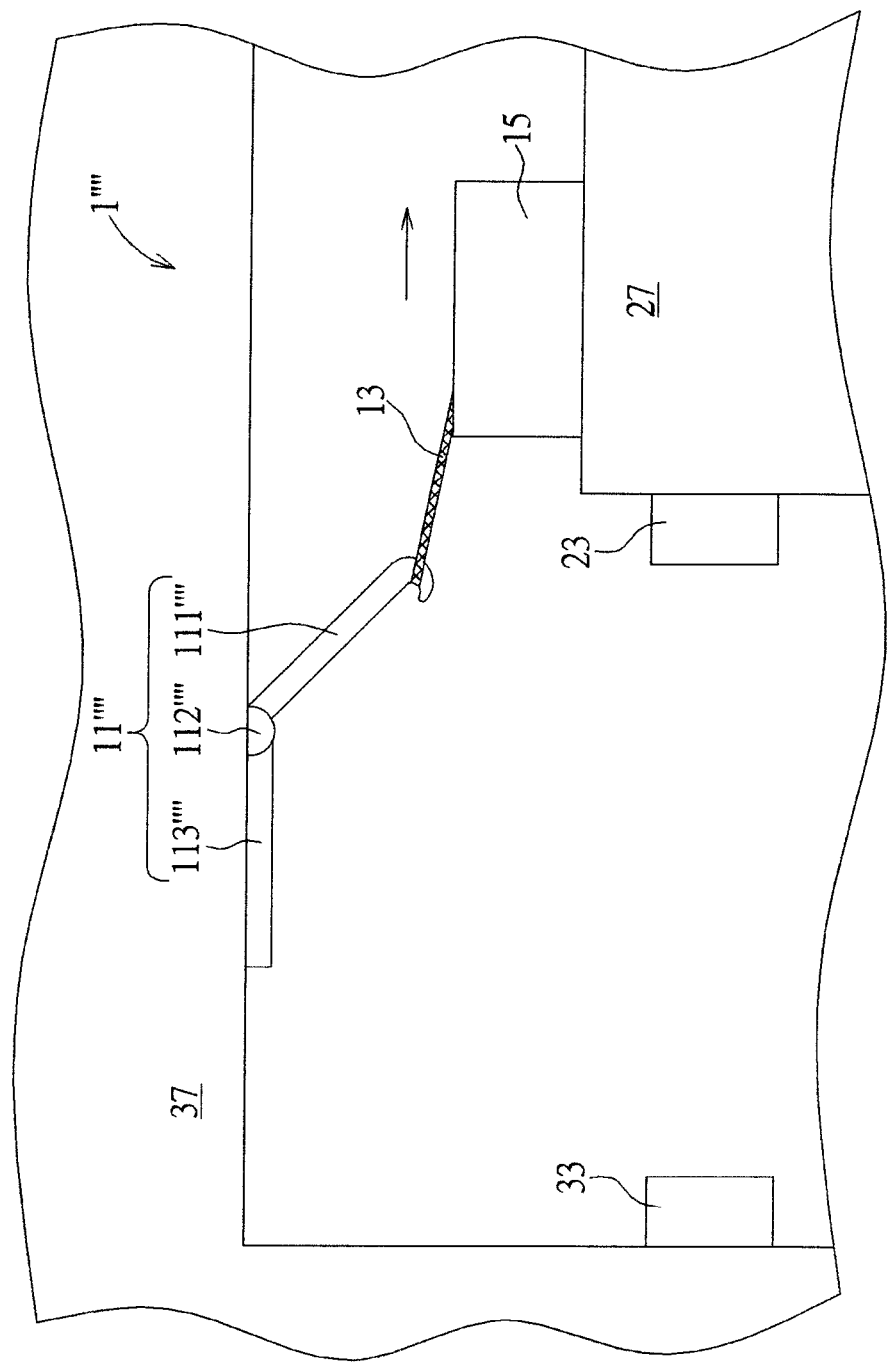

Further referring to FIGS. 11-13, FIGS. 11-13 are schematic views respectively showing a car door opening mechanism 1'''' according to a third embodiment of the present invention in different conditions. As shown in FIGS. 11-13, in the instant embodiment, the car body 3 is further provided with a car door sensor 33, and the car door 2 is further provided with a car door shock-absorption rubber pillar 23. The car door shock-absorption rubber pillar 23 and the car door sensor 33 are arranged to correspond to each other, and the car door sensor 33 and the car door shock-absorption rubber pillar 23 are respectively mounted to the car-body opening/closing side 37 and the car-door opening/closing side 27; however, the present invention is not limited thereto. In a different embodiment, alternatively, the car door sensor 33 and the car door shock-absorption rubber pillar 23 may be respectively mounted to the car-body bottom side 36 and the car-door bottom side 26. When the car door 2 is at the closed position relative to the car body 3, the car door shock-absorption rubber pillar 23 is in contact engagement with the car door sensor 33; and when the car door 2 is moved away from the closed position relative to the car body 3, the car door shock-absorption rubber pillar 23 separates from the car door sensor 33, and under such a condition, the car door sensor 33 generates a door opening signal to notify the user that the car door 2 is not fully closed. The car door opening mechanism 1'''' may further comprise a mounting seat 15 that is mounted to the car door 2. The mounting seat 15 is made of a rubber material; however, the present invention is not limited thereto. The connection structure 13 is mounted on the mounting seat 15 and raised from the mounting seat 15. The connection structure 13 and the mounting seat 15 are arranged on the car-door opening/closing side 27 at a location adjacent to the car door shock-absorption rubber pillar 23. The car door opening mechanism 1'''' comprises a first coupling member 11'''' that comprises a coupling part 111'''', a pivoting part 112'''', and a abutting part 113''''. The pivoting part 112'''' is mounted, in a rotatable manner, to the car-body opening/closing side 37 at a location adjacent to the car door sensor 33. The coupling part 111'''' and the abutting part 113'''' are connected to the pivoting part 112''' and are extended in different directions. In the instant embodiment, an included angle defined between the coupling part 111'''' and the abutting part 113'''' is preferably greater than 90 degrees. In a process that the car door 2 is being closed relative to the car body 3, interference between the connection structure 13 and the abutting part 113'''' drives the first coupling member 11'''' to rotate until the abutting part 113'''' gets in contact engagement with and thus abuts the car-body opening/closing side 37 of the car body 3, allowing the connection structure 13 to pass over the first coupling member 11''''. In a process that the car door 2 is being opened relative to the car body 3, the coupling part 111'''' hooks on and engages with the connection structure 13 to constrain the car door 2 at a non-fully opened position relative to the car body 3. Afterwards, to fully open the car door, the user only needs to make an operate to have the first coupling member 11'''' and the connection structure 13 detached from each other (such as making an operation of rotating the first coupling member 11'''' to have the coupling part 111'''' and the connection structure 13 separate from each other), and then, the car door 2 can be further opened toward the fully opened position. However, the way and the location for arrangement of the first coupling member 11'''' and the connection structure 13 of the present invention are not limited to such an example. For example, in another embodiment, the first coupling member 11'''' and the connection structure 13 are integrally formed with and coupled to the car door sensor 33 and the car door shock-absorption rubber pillar 23, respectively; or, in an alternative embodiment, the first coupling member 11'''' and the connection structure 13 may be switched in respect of positions thereof respectively arranged at a location adjacent to the car door shock-absorption rubber pillar 23 and a location adjacent to the car door sensor 33, or are, alternatively, integrally formed with the car door shock-absorption rubber pillar 23 and the car door sensor 33. Further, in an alternative embodiment, the first coupling member 11'''' and the connection structure 13 are respectively set on one and the other one of the car-body bottom side 36 and the car-door bottom side 26 and correspond to each other and are distant from the car door shock-absorption rubber pillar 23 and the car door sensor 33. Further, as an alternative, the mounting seat 15 may be omitted and the connection structure 13 is directly mounted to the car-door opening/closing side 27.

Compared to the prior art, the present invention uses a coupling arrangement between the first coupling member and the connection structure to constraint the car door at a non-fully opened position relative to the car body by means of the connect structure at the time when the user intends to open the car door relative to the car body. At this moment, the user needs to make a further operation in order to have the first coupling member and the connection structure detach from each other in order to allow the car door to be further opened relative to the car body to the fully opened position. In this way, the two-stage car door opening operation according to the present invention could effectively prevent collision caused by an unexpected incident of fully opening of a car door.

I claim:

1. A car door opening mechanism, the car door opening mechanism being installed between a car body and a car door that is rotatable relative to the car body, wherein the car body comprises a car-body pivoting side, a car-body top side, a car-body bottom side, a car-body opening/closing side, a door lock hook, and a car door sensor; the car-body top side and the car-body bottom side are adjacent to the car-body pivoting side and are opposite to each other; the car-body opening/closing side and the car-body pivoting side are opposite to each other; the car-body opening/closing side is adjacent to the car-body top side and the car-body bottom side; the car door comprises a car-door pivoting side, a car-door top side, a car-door bottom side, a car-door opening/closing side, a door lock actuator corresponding to the door lock hook and engageable with the door lock hook, and a car door shock-absorption rubber pillar corresponding to the car door sensor and contactable with the car door sensor; the car-door top side and the car-door bottom side are adjacent to the car-door pivoting side and are opposite to each other; the car-door opening/closing side and the car-door pivoting side are opposite to each other; the car-door opening/closing side is adjacent to the car-door top side and the car-door bottom side; the car-door pivoting side and the car-body pivoting side are connected to each other in a manner of being rotatable relative to each other; wherein the car door opening mechanism comprises:

a connection structure, which is selectively mounted to one of the door lock actuator, the door lock hook, the car door sensor, and the car door shock-absorption rubber pillar; and a first coupling member, which is operable to selectively couple to and detach from the connection structure, wherein for the connection structure being mounted to the door lock hook, the first coupling member is mounted to the door lock actuator; for the connection structure being mounted to the door lock actuator, the first coupling member is mounted to the door lock hook; for the connection structure being mounted to the car door sensor, the first coupling member is mounted to the car door shock-absorption rubber pillar; for the connection structure being mounted to the car door shock-absorption rubber pillar, the first coupling member is mounted to the car door sensor;

wherein when the car door is at a closed position relative to the car body, the first coupling member and the connection structure are coupled to each other; in a process that the car door is being opened relative to the car body, an opening angle of the car door relative to the car body is constrained by a length of the connection structure due to the connection structure and the first coupling member being coupled to each other, so that the car door is constrained at a non-fully opened position between a fully opened position and the closed position relative to the car body; and when the first coupling member and the connection structure are detached from each other, the car door is allowed to open relative to the car body from the non-fully opened position to the fully opened position.

2. The car door opening mechanism as claimed in claim 1, further comprising a control unit, wherein the control unit is electrically connected to the first coupling member to selectively control the first coupling member and the connection structure to couple to each other or detach from each other.

3. The car door opening mechanism as claimed in claim 2, wherein the first coupling member comprises a pillar mounted, in an extendable and contractible manner, to one of the car door and the car body and when the car door is at the closed position relative to the car body, the control unit controls the first coupling member to extend and couple to the connection structure.

4. The car door opening mechanism as claimed in claim 3, wherein when the car door is constrained at the non-fully opened position relative to the car body, the control unit further controls the first coupling member to contract so as to detach from the connection structure to allow the car door to be opened relative to the car body to the fully opened position.

5. The car door opening mechanism as claimed in claim 1, further comprising a second coupling member arranged on the connection structure, wherein when the car door is at the closed position relative to the car body, the connection structure is coupled, by means of the second coupling member, to the first coupling member.

6. The car door opening mechanism as claimed in claim 5, further comprising a control unit, wherein the control unit is electrically connected to at least one of the first coupling member and the second coupling member to selectively control the second coupling member and the first coupling member to couple to or detach from each other.

7. The car door opening mechanism as claimed in claim 6, wherein the first coupling member and the second coupling member are each an electromagnet, and the control unit controls magnetisms of the first coupling member and the second coupling member to selectively control the first coupling member and the second coupling member to magnetically attract each other or not.

8. The car door opening mechanism as claimed in claim 6, wherein one of the first coupling member and the second coupling member comprises an electromagnet, and the other one of the first coupling member and the second coupling member comprises a magnetically permeable member or a permanent magnet, and the control unit controls magnetism of the electromagnet so as to selectively control the first coupling member and the second coupling member to magnetically attract each other or not.

9. The car door opening mechanism as claimed in claim 1, wherein the connection structure comprises an extendable/contractible member and when the car door is at the closed position relative to the car body, the first coupling member and the extendable/contractible member are coupled to each other; in a process that the car door is being opened relative to the car body, the extendable/contractible member is extended with increase of an opening angle of the car door relative to the car body until a length of the extendable/contractible member reaches a predetermined length so that the car door is constrained at the non-fully opened position between the fully opened position and the closed position relative to the car body.

10. The car door opening mechanism as claimed in claim 9, wherein the connection structure is made of an elastic material.

11. The car door opening mechanism as claimed in claim 9, wherein the connection structure comprises an extendable/contractible rod or an extendable/contractible wire.

12. The car door opening mechanism as claimed in claim 1, wherein the connection structure comprises a wire or a chain made of a rigid material.

13. The car door opening mechanism as claimed in claim 1, wherein the first coupling member comprises a coupling part, a pivoting part and an abutting part, the pivoting part being mounted to the car door on the car body in a rotatable manner, the coupling part and the abutting part being connected to the pivoting part to extend in different directions, wherein in a process that the car door is being closed relative to the car body, interference between the connection structure and the abutting part drives the first coupling member to rotate so as to allow the connection structure to pass over the first coupling member, and in a process that the car door is being opened relative to the car body, the coupling part hooks on and engages with the connection structure to constrain the car door at the non-fully opened position relative to the car body.

14. The car door opening mechanism as claimed in claim 13, wherein the coupling part and the abutting part define an included angle that is greater than 90 degrees therebetween.

15. The car door opening mechanism as claimed in claim 13, further comprising a mounting seat attached to the car body or the car door, wherein the connection structure is mounted on the mounting seat and is raised from and projects from the mounting seat, the mounting seat being made of a rubber material.

\* \* \* \* \*